Aug. 19, 1969  RYUICHI OHMURA  3,461,594
SEATING DEVICE FOR FISHING REEL
Filed Jan. 28, 1966
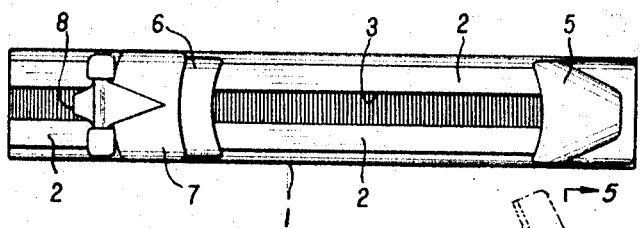
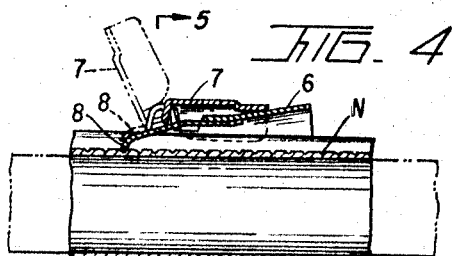
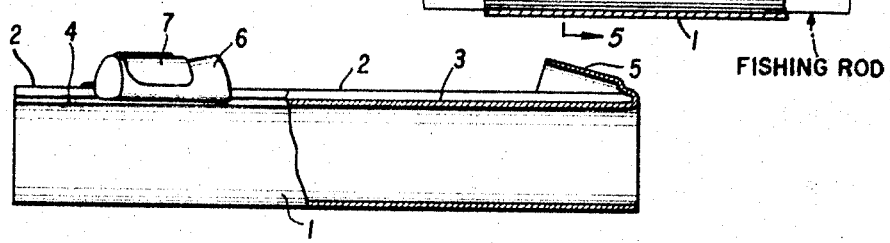
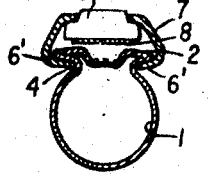
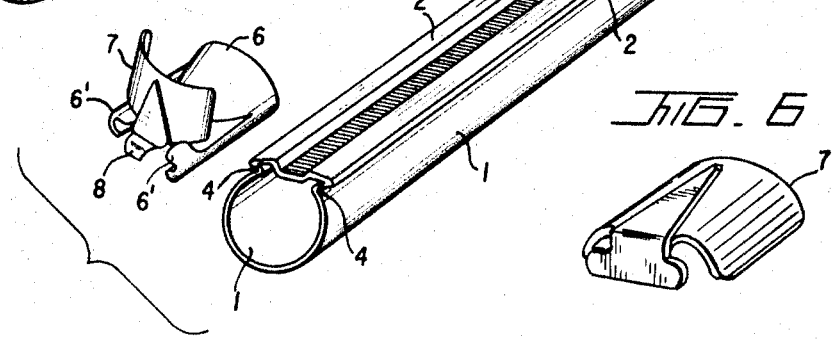
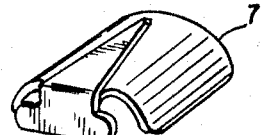

United States Patent Office 3,461,594
Patented Aug. 19, 1969

3,461,594
SEATING DEVICE FOR FISHING REEL
Ryuichi Ohmura, Shizuoka, Japan, assignor to Fuji Kogyo Company Limited, Shizuoka, Shizuoka Prefecture, Japan, a Japanese company
Filed Jan. 28, 1966, Ser. No. 523,764
Claims priority, application Japan, Oct. 26, 1965, 40/65,642
Int. Cl. A01k 87/06
U.S. Cl. 43—22                                        3 Claims

ABSTRACT OF THE DISCLOSURE

A seating device for mounting a fishing reel on a fishing rod including a hollow body adapted to fit over a fishing rod and having a pair of flat tracks on its upper surface, a pair of guide grooves extending therealong beneath the tracks, and a depressed portion between the tracks having axially spaced laterally extending notches thereon. A tapered socket is fixed at one end of the body to accommodate one leg of a fishing reel base. A moveable socket has inturned end portions engageable in the guide grooves and also has a resilient tongue at one end directed toward but biased away from the notches. A pressure piece, which cooperates with the tongue, is pivoted to the moveable socket for movement between a first position in which the tongue is out of engagement with any notch and allows the moveable socket to slide along the hollow body to fit over the other leg of a fishing reel base, and a second position in which the piece presses such tongue into the then underlying notch to hold the reel on the seating device.

---

The present invention relates to an improved accessory device to be employed in conjunction with a fishing gear, and more particularly to an improved seating device for mounting a reel on a fishing rod.

One object of the present invention is to provide an improved seating device for mounting a reel on a fishing rod comprising a hollow cylindrical base body of substantial strength.

Another object of the present invention is to provide an improved seating device for mounting a reel on a fishing rod which can hold the reel in a stabilized position on the fishing rod.

A further object of the present invention is to provide an improved seating device for mounting a reel on a fishing rod which is light in weight, smooth in operation and easy in handling.

According to the present invention, there is provided a seating device for mounting a reel on a fishing rod which comprises a hollow cylindrical base body, a pair of integral and planar or flat track portions formed on the upper surface of said base body so as to be parallel to each other and to the axis of the body, a hollow stationary tapered socket secured to one end of said base body and straddling and overlying the adjacent end of said pair of flat track portions, a moveable tapered socket constituting a reel tightening member slidably fit on said pair of track portions for slidable movement thereon toward and away from said stationary tapered socket, a pressure piece hinged to one end of said moveable tapered socket for assuming upright and horizontal positions, and an elastic piece provided at and extending forwardly from one end of said tightening member and adapted to be pushed down against the upper surface of said base body at an intermediate portion between said pair of track portions.

The above and other objects, features and attendant advantages of the present invention will become apparent to those skilled in the art from a reading of the following detailed explanation of a preferred embodiment thereof in conjunction with the accompanying drawings.

In the drawings:

FIGURE 1 is a top plan view illustrating a preferred form of a seating device for a fishing reel according to the present invention, FIGURE 2 is a side elevational view, partially cut away illustrating the manner in which the seating device of FIGURE 1 is to be mounted on a fishing rod, FIGURE 3 is an exploded perspective view of the component elements shown in FIGURE 1, FIGURE 4 is a fragmentary longitudinal sectional view through the tubular body and moveable socket of the seating device according to the invention and illustrating the pressure piece and tongue in locking relation in full lines and conditioned for sliding movement in dotted lines, FIGURE 5 is a cross-sectional view taken along line 5—5 of FIGURE 4, and FIGURE 6 is a perspective illustrating the pressure piece.

The figures of the drawings illustrate a preferred form of fishing reel seating device embodying the present invention. The novel fishing reel seating device generally comprises a hollow tubular body 1 of generally cylindrical form of suitable length and diameter for receiving a fishing rod. The upper surface of the base body 1 is deformed so as to provide a pair of straight raised flat track portions 2 extending along the axis of the base body as more clearly shown in FIG. 3. The pair of track portions 2 are parallel and spaced from each other so as to define a recess or depressed groove 3 having a plurality of axially spaced notches N thereon the function of which will be explained hereinafter in connection with the mounting of a reel on a fishing rod by the novel seating device to which the present invention pertains. When the hollow cylindrical body 1 is deformed so as to provide the raised track portions 2 a pair of straight outer guide grooves 4 are also formed at the external junctions between the respective track portions 2 and base body 1. Although the track portions 2 are illustrated as integral parts of the base body 1 formed by pressing out the material of the base body 1 in the present embodiment, these track portions may be formed as separate parts from the base body and secured to the base body by any suitable known means as desired. In connection with the track portions 2, the important point is that the track portions and base body must be always put together as one body. The hollow cylindrical base body 1 is provided at one end with an arcuate section stationary tapered socket 5 which is adapted to receive and retain one leg of a fishing reel, not shown. The tapered socket 5 straddles the adjacent end of the pair of track portions 2 and the tip end portions of the opposite legs of the tapered socket 5 extend into the associated guide grooves 4 where the legs of the tapered socket 5 are secured to the base body 1 by any suitable known means. A moveable tapered socket 6 constituting a reel tightening member is slidably fit on the pair of track portions 2 straddling them for sliding movement therealong. The moveable tapered socket 6 has substantially the same arcuate section configuration as that of the tapered socket 5 and is provided with a pair of opposed lower in turned end portions 6' at the tip ends of the opposite legs thereof. These inturned end portions 6' extend into and engage within the associated guide grooves 4 as in the case of the legs of the abutment member 5 thereby to embrace the two track portion 2. A pressure piece 7 having an arcuate section following the curvature of the upper portion of the moveable tapered socket 6 is hinged at one end of the moveable tapered socket 6 and the pressure piece has a first upright position in which the pressure piece stands at substantially right angles to the tightening member and a second horizontal position in which the pressure piece overlies the moveable tapered socket. As clearly shown in FIGURES 3 to 6 the moveable tapered socket 6 has a resilient tongue 8 extending from the inner surface of the narrow end thereof. This tongue 8 has its end shaped to include a portion that can fit within the groove 3 and be located between the tracks 2 and directed toward the series of notches N, FIGURE 4. The pressure piece 7 is pivoted to the moveable tapered socket 6 adjacent the narrow end thereof and includes a tongue cooperating surface. Thus when the pressure piece is in a first upright position shown in dotted lines in FIGURE 4, the tongue 8 is out of engagement with any notch and the moveable tapered socket 6 can slide along the tubular body 1. When the pressure piece 7 is moved about an axis transverse to the tracks 2 to a second and lowered position shown in full lines in FIGURE 4, the tongue cooperating surface of the pressure piece presses 7 down on the top of tongue 8 to press the end of such tongue into the then underlying notch to secure the seating device and a reel having its base ends in the respective sockets in a fixed position on the tracks. The moveable tapered socket 6 may be formed in any other shape so long as the same can slide on the track portions 2 and retain its stopped position.

When the novel fishing reel seating device with the above-mentioned construction and arrangement of various parts is used for mounting a reel on a fishing rod, the slidable moveable tapered socket 6 is first moved away from the stationary tapered socket 5 with the pressure piece 7 held in its first or upright position and then a fishing rod is passed through the hollow cylindrical base body 1 with the track portions 2 placed atop. Then one leg of a fishing reel is placed atop the track portions and moved until abutted by the arcuate tapered socket 5 and retained therein. Thereafter, the slidable tapered socket 6 is moved back along the track portions 2 toward the cooperating stationary tapered socket 5 until the moveable tapered socket may fit over the other leg of the fishing reel whereupon the now standing pressure piece 7 is lowered to push down the elastic engaging tongue 8 down so that it in turn engages in one selected notch of the plurality of notches N on the bottom of groove 3 whereby the fishing reel may be firmly held on the track portions 2 of the base body 1.

In a prior art fishing reel seating device the base body of the seating device was formed by an oval section member and the flattened surface of the base body itself was employed as the track means. Tightening members were slidably fit on the base body and the opposite ends of the base body were bound to the fishing rod by means of strings or the like. In another type of prior art fishing reel seating device the base body in a form of cylindrical member was used as the mounting means and fit on a fishing rod. The outer surface of the seat body was provided with a spiral male thread forthreadably engage with the mating spiral female thread on a reel tightening-stop means. However, in the former prior art fishing reel seating device there were disadvantages that the slide movement of the tightening member relative to the base body was not smooth, the tightening force on the legs of the reel by the tightening member was often insufficient, and the strings binding the base body to the fishing rod became loose and/or rotten which lead to rocking movement and/or dislocation of the reel during the fishing operation. In the latter prior art fishing reel seating device since the legs of the reel were directly mounted on the peripheral surface of the cylindrical member fit on the fishing rod, the upright position of the reel was unstable, the thread engaging between the cylindrical mounting member and the reel tightening-stop means often became loosened during the fishing operation which led to rocking movement of the reel, and furthermore, provision of a spiral male thread on the cylindrical member often brought out undesirable results, and the weight of the seating device was substantially heavy resulting in inconvenience in mounting and removing the reel on and away from the fishing rod.

However, in the novel fishing reel seating device according to the present invention, since the base body is formed of a relatively thin-walled cylindrical member and the upper surface of the base body is provided with a pair of integral plane or flat track portions in parallel to each other and extending along the axis of the base body, the strength of the base body itself is substantially greater than that of the corresponding components of the prior art reel seating devices. Since the legs of the fishing reel are tightened on the plane or flat track portions of the base body, the base body and reel can be firmly secured together whereby the reel can be effectively prevented from rocking movement and/or disclocating during the fishing operation thereby to ensure stabilized positioning of the reel at any moment during the fishing operation, and furthermore, since the moveable tapered socket can smoothly slide on the track portions and the entire seating device can be formed substantially lighter as compared with the prior art reel seating devices, the operation and handling of the novel reel seating device are advantageous than any of the prior art reel seating devices.

What is claimed is:

1. In a seating device of the type that secures the oppositely extending legs of a fishing reel base on a fishing rod, an elongated hollow body adapted to fit over a fishing rod, a pair of mutually spaced, parallel flat tracks extending along the upper surface of such body, the portion of the body between the tracks being below the level of the tracks and having a plurality of axially spaced, laterally extending notches therein, said tracks having opposite outer edges overhanging the body and defining therewith a pair of guide grooves extending along the body, a tapered socket fixed at one end of the body and overlying the adjacent portions of the tracks for receiving one leg of a fishing reel base to secure the same against such track portions, another and moveable tapered socket having opposed lower inturned end portions engageable in said guide grooves so as to mount such last-mentioned tapered socket for sliding movement along the body toward and away from said first mentioned fixed tapered socket, said moveable tapered socket having a resilient tongue extending from the narrow end of said moveable tapered socket and shaped to include a portion located between the tracks and directed toward the notches and a pressure piece having a tongue cooperating surface and pivoted to the moveable socket adjacent the narrow end thereof for movement about an axis transverse of such tracks between a first upright position in which said tongue is out of engagement with any notch and the moveable socket can slide along the body to fit over the opposite leg of a fishing reel base to clamp the same against the tracks and a second lowered position in which said surface presses said tongue into the then underlying notch to secure the reel in position on said tracks.

2. A seating device as claimed in claim 1 in which said tracks are integral with said body.

3. A seating device as claimed in claim 1 in which said pressure piece is of arcuate cross section, following the curvature of the upper portion of the moveable socket.

References Cited

UNITED STATES PATENTS

| 1,923,035 | 8/1933 | Hoerle et al. | 43—22 |
| 849,231 | 4/1907 | Gorham | 43—22 |
| 1,897,889 | 2/1933 | Clarke | 43—22 |
| 1,970,348 | 8/1934 | Turano | 43—22 |

FOREIGN PATENTS

| 1,163,801 | 5/1958 | France. |
| 1,234 | 1884 | Great Britain. |
| 252,488 | 10/1948 | Switzerland. |

ALDRICH F. MEDBERY, Primary Examiner

JAMES H. CZERWONKY, Assistant Examiner